Feb. 10, 1925.
D. MOIR ET AL
MEANS FOR THE MANUFACTURE, CENTRIFUGALLY, OF PIPES,
COLUMNS, AND OTHER HOLLOW ARTICLES
Filed July 24, 1923     3 Sheets-Sheet 1
1,525,878
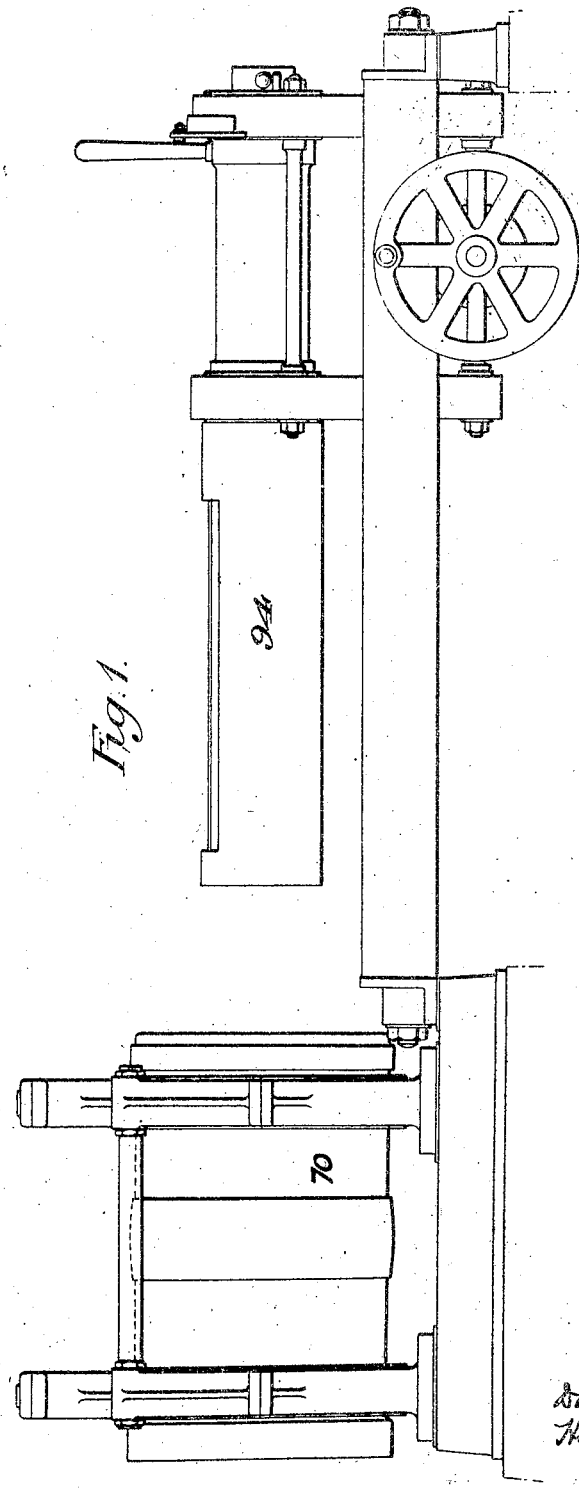

Feb. 10, 1925. 1,525,878
D. MOIR ET AL
MEANS FOR THE MANUFACTURE, CENTRIFUGALLY, OF PIPES,
COLUMNS, AND OTHER HOLLOW ARTICLES
Filed July 24, 1923 3 Sheets-Sheet 2
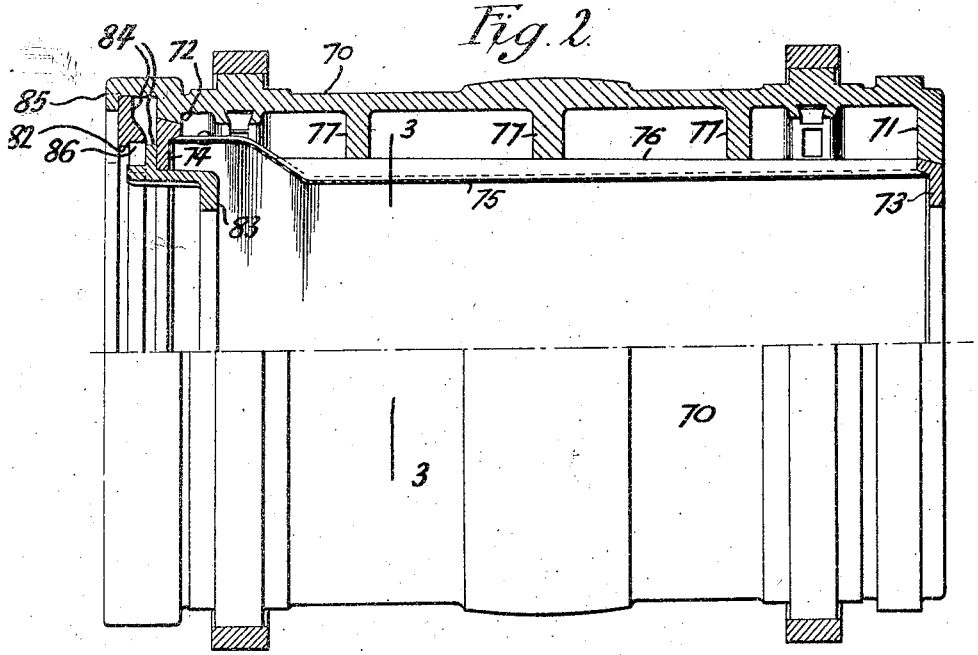
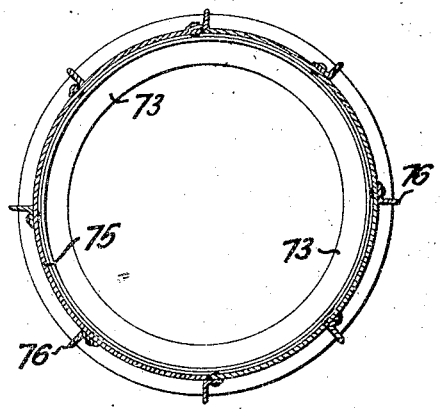
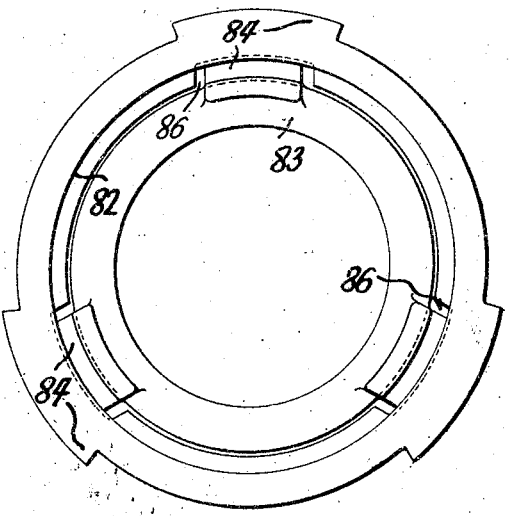

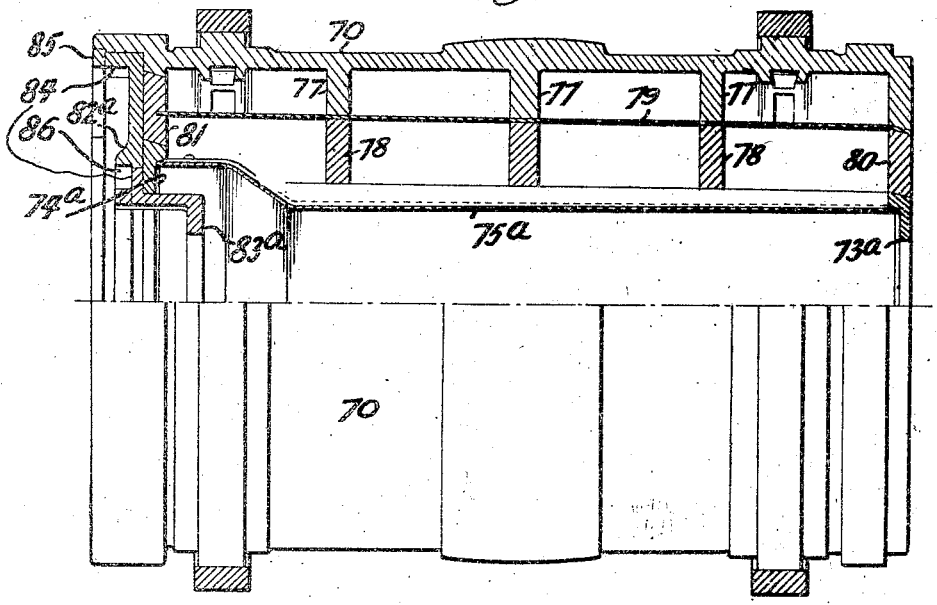
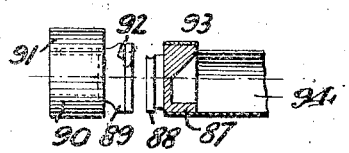
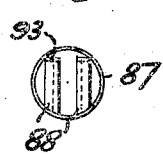
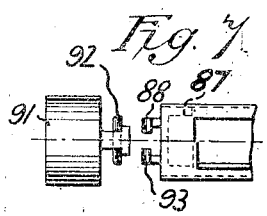

Patented Feb. 10, 1925.

1,525,878

UNITED STATES PATENT OFFICE.

DONALD MOIR AND HUGH BUCHANAN, OF ROSARIO DE SANTA FE, ARGENTINA.

MEANS FOR THE MANUFACTURE, CENTRIFUGALLY, OF PIPES, COLUMNS, AND OTHER HOLLOW ARTICLES.

Application filed July 24, 1923. Serial No. 653,552.

*To all whom it may concern:*

Be it known that we, DONALD MOIR and HUGH BUCHANAN, subjects of the King of Great Britain and Ireland, residing, respectively, at Rosario de Santa Fe, Argentine Republic, have invented Improvements in or Relating to Means for the Manufacture, Centrifugally, of Pipes, Columns, and Other Hollow Articles, of which the following is a specification.

This invention relates to means for the manufacturing of articles, centrifugally, such as is set forth in the specification of Letters Patent Nos. 1223602 and 1286056 and it has for its object to provide an improved machine or apparatus which will enable pipes and other hollow ware of different external dimensions to be more readily produced and with polished or smoothened interiors when so desired.

One feature of the invention consists in arranging for the building up of the regional supports within the rotary mould carrier to suit different sized moulds, the several increment supports throughout the length of the carrier being collectively united to form a member which can be inserted endwise into and similarly removed from the carrier.

Another feature of the invention consists in the provision upon the trough employed to distribute material within the mould, of a readily removable travelling device having a number of eccentrically arranged curved blades of a yielding character, which blades as the trough is withdrawn from the mould whilst the latter is rotating act upon the interior of the concrete lining or the like.

One constructional form of machine embodying these features is illustrated in the accompanying drawings, whereof Fig. 1 is a side elevation of a pipe making machine. Fig. 2 is a central longitudinal section of a part of Fig. 1. Fig. 3 is a transverse section on the line 3, 3 of part of Fig. 2. Fig. 4 is an end elevation of parts of Fig. 2. Fig. 5 is a view similar to Fig. 2 of another assemblage of parts for producing smaller pipes in the same machine. Fig. 6 shows a polisher in side elevation and a portion of a trough in section from which the polisher has been removed. Fig. 7 is a plan of the parts shown in Fig. 6 and Figs. 8 and 9 are end elevations looking in the same direction, of the left and right hand parts respectively of Fig. 6.

As here shown, the rotary belt driven casing 70 is formed with an internal flange 71 at one end and with a similar but smaller flange 72 near the other end, both flanges being tapered to receive correspondingly tapered rings or formers 73, 74 constituting part of the sheet metal mould 75 shown in Figs. 2 and 3. This mould which has external angle iron tapering ribs 76 is supported intermediate of its length by rings 77 of gradually increasing diameter from one end of the carrier to the other all in a manner now well known. When however it is desired to make a smaller pipe and to employ a mould such as shown in Fig. 5, the rings 77 need not be altered but simply caused to support other rings 78 in the same planes which are shown as united by a sheet metal sleeve 79 having end rings 80 and 81 which latter occupy the positions previously occupied by the mould rings 73, 74 and are themselves tapered internally to receive the rings 73ª, 74ª of the smaller mould 75ª. The mould 75 Fig. 2 is shown as held in position by means of a ring 82 and a former 83, each as shown in Fig. 4 formed with locking lugs 84, the lugs of the ring 82 passing through gaps in the flange 85 of the casing 70 and the lugs of the former 83 passing through similar gaps 86 in the ring 82. In Fig. 2 the ring 82 has been turned into locking position but the former 83 has not but is represented as in the position shown in Fig. 4.

The retention of the smaller mould 75ª which in its turn holds the sleeve 79 in position is effected by an equivalent locking ring 82ª and former 83ª of appropriate size, shown in Fig. 5.

The rings 74 and 74ª in each case determine the extreme end formation of the faucet of the pipe and the formers 83 and 83ª similarly determine the formation of the shoulder in the faucet, the lugs 84 of the said formers between which a portion of the concrete may slightly flow being employed to trim off the excess by rotating the former by hand. 94 Fig. 1 represents the trough which is introduced longitudinally into the mould and is eccentrically mounted, but which forms no part per se of the present invention.

For the purpose of treating the inner surface of a pipe whilst the mould is being rotated the head 87 of the trough, Figs. 6, 7 and 9, is shown as provided with two guides 88 to receive a T shaped member 89 upon a boss 90 equipped with three springy blades 91. The member 89 may be fitted with a cross pin 92 adapted to rest in curved seatings 93 upon the guides 88 in order to hold the polisher in position but obviously this may be effected in other ways.

What we claim is:—

1. In means of the kind herein referred to, a rotary carrier having internal annular abutments distributed throughout its length, said abutments decreasing in diameter from one end of the carrier to the other and adapted to be engaged by longitudinal ribs forming a tapering guide arrangement external to a mould of a given dimension, inserted lengthwise into the carrier, and means whereby said annular abutments can be radially built up to enable a smaller mould to be equivalently supported, said means comprising rings of varying external diameters corresponding severally to the internal diameter of the main carrier abutments and collectively united by an external tapering sheet metal sleeve, the said sleeve being first inserted endwise into the carrier and the mould thereafter inserted endwise into the sleeve, substantially as described.

2. In means of the kind herein referred to, a rotary carrier having a series of annular abutments constituting an internal tapering support system, an auxiliary support system comprising rings and a uniting sleeve constituting an internally and externally tapering structure adapted to be inserted endwise into the rotary carrier, a mould having longitudinal ribs constituting an external tapering structure adapted to be inserted endwise in the same sense into the structure constituting the auxiliary support system, and a ring adapted to be interlocked with the carrier by rotating motion, adapted to hold both the mould and auxiliary support system in position within the carrier substantially as described.

3. In means of the kind herein referred to, a rotary carrier having a series of annular abutments constituting an internal tapering support system, an auxiliary support system comprising rings and a uniting sleeve constituting an internally and externally tapering structure adapted to be inserted endwise into the rotary carrier, a mould having longitudinal ribs constituting an external tapering structure adapted to be inserted endwise in the same sense into the structure constituting the auxiliary support system, a ring adapted to be interlocked with the carrier by rotary motion, adapted to hold both the mould and auxiliary support system in position within the carrier and a former adapted to be interlocked with the ring aforesaid by a rotary motion substantially as described.

4. In means of the kind herein referred to, a trough having a head provided with guides and a trowelling device comprising springy blades upon a boss having a T shaped member adapted to be engaged by the guides aforesaid.

Signed at Rosario, Argentina, by the said DONALD MOIR, this 5th day of June, 1923.

DONALD MOIR.

Signed at London, England, by the said HUGH BUCHANAN, this 25th day of April, 1923.

HUGH BUCHANAN.